July 16, 1957   J. ZAGORSKI ET AL   2,799,524
WOUND FLANGE PACKING RINGS FOR TUBING, CYLINDERS, ETC
Filed Sept. 18, 1953

Inventor:
Johann Zagorski &
Johann Zagorski
By Michael S. Striker

United States Patent Office 2,799,524
Patented July 16, 1957

2,799,524

WOUND FLANGE PACKING RINGS FOR TUBING, CYLINDERS, ETC.

Johann Zagorski, Vienna, Austria, and Johann Zagorski, Esslingen, Germany

Application September 18, 1953, Serial No. 381,141

10 Claims. (Cl. 288—27)

Flange packings, used for the purpose of stuffing pipe joints, consist mostly of asbestos fiber sheet with additions of rubber, varnish or oil, baryta and colouring matters. The flange packings are cut out in rings or are stamped out in another form. To increase the strength of such flange packings, wire netting plies are worked into the packing sheets as intermediate layers. Such flange packings have the disadvantage of comparatively small strength and of little resistance against high temperatures. They cannot be used with lyes and acids. In case of acids and lyes, gaskets stamped or cut out of asbestos sheets are used. These gaskets have the disadvantage that their strength is small and that, therefore, they are suitable only for low compression strains. Flange packings are also produced directly as rings in the required diameters. Their outer surfaces consist of thin metal sheets, mostly copper sheet, with an intermediate asbestos layer. Such flange packings are practical only in smaller diameters and for lower pressures. These, also, are unsuitable for lyes or acids and they are expensive. Flange packings are also used which consist of an undulated plate ring as intermediate ring or intermediate layer, the plate thickness of which is a few tenths of a millimeter. The undulations are concentric said asbestos cords are inserted into the grooves on both sides of the undulated plate ring by means of a binding agent, e. g. varnish and the like. The production of such flange packings is expensive, and they cannot be used for lyes and acids.

Flange packings which are wound up of ribbons provided with adhesives and then compressed in an open die so that the ribbons interlock like groove and tongue are also used. Cords with wire lining are also wound on the flange to be stuffed and then compressed. The first kind of packing has the disadvantage that the ribbons must be rather wide so that such packings have considerable thickness. Such flange packings assume any form or diameter because of the pressing procedure in an open die. With higher temperatures, the adhesives burn and are destroyed by lyes and acids. For the latter kind of packing, the same is true with regard to the deformation of the diameters, and such stuffings have little strength in radial direction as they do not form a ring closed in itself. They are wound loosely onto the packing place.

The invention mainly consists in flange packings having cords composed of asbestos, cotton or any other fiber, and prepared with a tightening and binding agent, such as, for example, waterglass, silicone fluid, varnish, or rubber, and then wound to the desired measurement level round a mandrel on a disc where the thickness of the cord is chosen approximately between 2 and 5 mm. under consideration of the intended use. Preferably, formaldehyde flund is used as diluting agent for water glass or silicone liquid. The ends of the cords are then connected by means of wire, in case of cords with wire lining, or are soldered or welded so that in this way a ring is obtained which is closed in itself and tension resistant. Thereupon, the stuffing discs obtained in this way are graphited with a mixture of an inorganic binding agent, for instance water glass and graphite and talcum powder, respectively, or they are treated with talc, depending on the intended use, or they are treated as mentioned above with a mixture of graphite or talcum powder, respectively, and an organic binding agent. They are then desiccated and then pressed in a closed die which has the desired diameter of the flange packing. In case of rubber impregnation vulcanizathion may still be effected.

Reference is made to the drawing, in which.

Figure 1:
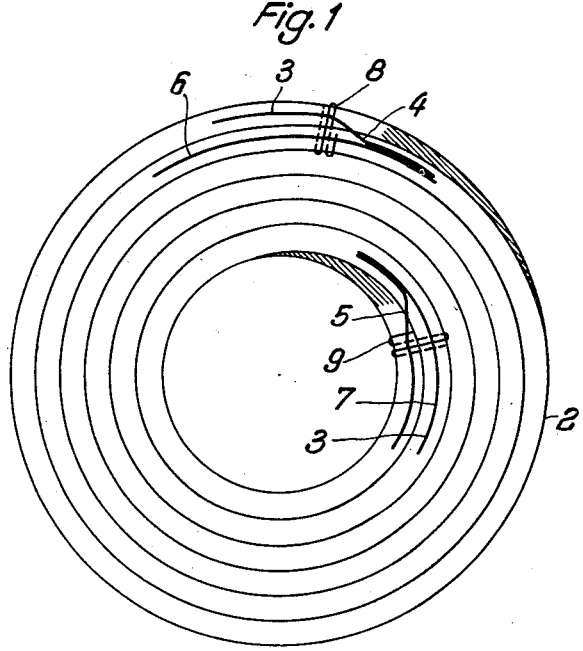
Fig. 1 is a top view of a packing according to the present invention.
Figure 2:
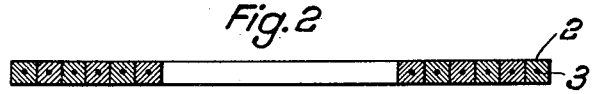
Fig. 2 is a cross section through said packing along the line A—A of Fig. 1.

A tension resistant cord 2, for instance an asbestos cord, having a reinforcing wire 3 extending throughout its entire length is wound in flat spiral turns within one plane so as to form a flat annular disc. Prior to winding the cord has been impregnated with a binding and tightening agent such as waterglass, silicon fluid, varnish or rubber solution. The ends 4 and 5 of the wire insert in the outermost and innermost winding respectively are soldered or welded to the wire insert in the respective adjacent windings 6 and 7. This is done by exposing the wire ends 4 and 5 and portions 6 and 7 of the wire insert in the adjacent windings by slitting open the cord surrounding said wire portions and welding or soldering together the exposed wire portions 4 and 6 respectively 5 and 7. The outer and inner end portions of the cord respectively are connected with the adjoining windings by means of wire loops 8 and 9. The thus shaped packing ring is then impregnated with an impregnating liquid such as waterglass, silicon fluid, varnish or rubber solution. This impregnating liquid may contain substances such as graphite or talcum powder. Finally the packing ring is pressed into the shape of a flat annular disc of predetermined dimensions.

Flange packing rings according to the present invention have a maximum of radial strength and resistance against high temperatures and high steam pressure.

The dimensioned stuffing rings, being closed in themselves, and having the strength of the cords increased considerably by the impregnation and the further treatment stated, the resulting flange stuffings have a maximum of radial strength. In this way flange stuffing rings can be produced for temperatures up to above 500° C., for high compression strains during operation and, further, for all lyes and acids.

We claim:

1. An annular packing ring consisting of an impregnated tension resistant cord wound in spiral turns located in a plane and superimposed upon each other and having an inner cord end portion on the inner face of the annular packing ring and an outer cord end portion on the outer face of said annular packing ring; and means connecting each of said cord end portions to the next turn of said cord, respectively, so as to ensure shape retention and tension resistance of said annular packing ring.

2. An annular packing ring consisting of an impregnated tension resistant cord wound in spiral turns located in a plane and superimposed upon each other and having an inner cord end portion on the inner face of the annular packing ring and an outer cord end portion on the outer face of said annular packing ring; and wire loop means connecting each of said cord end portions to the next turn of said cord, respectively, so as to ensure shape retention and tension resistance of said annular packing ring.

3. An annular packing ring consisting of a tension resistant cord impregnated with a substance selected from the group consisting of waterglass and silicon oil wound in spiral turns located in a plane and superimposed upon each other and having an inner cord end portion on the inner face of the annular packing ring and an outer cord end portion on the outer face of said annular packing ring; and wire loop means connecting each of said cord end portions to the next turn of said cord, respectively, so as to ensure shape retention and tension resistance of said annular packing ring.

4. An annular packing ring consisting of a tension resistant cord impregnated with a substance selected from the group consisting of oil varnish and rubber solution wound in spiral turns located in a plane and superimposed upon each other and having an inner cord end portion on the inner face of the annular packing ring and an outer cord end portion on the outer face of said annular packing ring; and wire loop means connecting each of said cord end portions to the next turn of said cord, respectively, so as to ensure shape retention and tension resistance of said annular packing ring.

5. An annular packing ring consisting of a tension resistant cord impregnated with a substance diluted in an aqueous solution of formaldehyde, said substance selected from the group consisting of waterglass and silicon oil wound in spiral turns located in a plane and superimposed upon each other and having an inner cord end portion on the inner face of the annular packing ring and an outer cord end portion on the outer face of said annular packing ring; and wire loop means connecting each of said cord end portions to the next turn of said cord, respectively, so as to ensure shape retention and tension resistance of said annular packing ring.

6. An annular packing ring consisting of a tension resistant cord impregnated with a mixture of a binding liquid oil with a packing material in powder form wound in spiral turns located in a plane and superimposed upon each other and having an inner cord end portion on the inner face of the annular packing ring and an outer cord end portion on the outer face of said annular packing ring; and wire loop means connecting each of said cord end portions to the next turn of said cord, respectively, so as to ensure shape retention and tension resistance of said annular packing ring.

7. An annular packing ring consisting of an impregnated tension resistant cord wound in spiral turns located in a plane and superimposed upon each other and having an inner cord end portion on the inner face of said annular packing ring and an outer cord end portion on the outer face of said annular packing ring; reinforcing wire means embedded within and extending through said spirally wound cord from one end thereof to the other so that said reinforcing wire means has one end portion located in said outer cord end portion and another end portion located in said inner cord end portion; and means securing said inner and outer end portions of said wire reinforcing means to the reinforcing wire means embedded in the next turn of said cord respectively, so as to ensure shape retention and tension resistance of said annular packing ring.

8. An annular packing ring consisting of an impregnated tension resistant cord wound in spiral turns located in a plane and superimposed upon each other and having an inner cord end portion on the inner face of said annular packing ring and an outer cord end portion on the outer face of said annular packing ring; reinforcing wire means embedded within and extending through said spirally wound cord from one end thereof to the other so that said reinforcing wire means has one end portion located in said outer cord end portion and another end portion located in said inner cord end portion; and solder means securing said inner and outer end portions of said wire reinforcing means to the reinforcing wire means embedded in the next turn of said cord respectively, so as to ensure shape retention and tension resistance of said annular packing ring.

9. An annular packing ring consisting of an impregnated tension resistant cord wound in spiral turns located in a plane and superimposed upon each other and having an inner cord end portion on the inner face of said annular packing ring and an outer cord end portion on the outer face of said annular packing ring; reinforcing wire means embedded within and extending through said spirally wound cord from one end thereof to the other so that said reinforcing wire means has one end portion located in said outer cord end portion and another end portion located in said inner cord end portion; and weld means securing said inner and outer end portions of said wire reinforcing means to the reinforcing wire means embedded in the next turn of said cord respectively, so as to ensure shape retention and tension resistance of said annular packing ring.

10. An annular packing ring consisting of an impregnated tension resistant cord wound in spiral turns located in a plane and superimposed upon each other and having an inner cord end portion on the inner face of said annular packing ring and an outer cord end portion on the outer face of said annular packing ring; reinforcing wire means embedded within and extending through said spirally wound cord from one end thereof to the other so that said reinforcing wire means has one end portion located in said outer cord end portion and another end portion located in said inner cord end portion; means securing said inner and outer end portions of said wire reinforcing means to the reinforcing wire means embedded in the next turn of said cord respectively; and wire loop means connecting each of said cord end portions to the next turn of said cord respectively, so as to ensure shape retention and tension resistance of said annular packing ring.

References Cited in the file of this patent
UNITED STATES PATENTS

| | | |
|---|---|---|
| 916,805 | Van Nostrand | Mar. 30, 1909 |
| 1,281,219 | Simpson | Oct. 8, 1918 |
| 1,614,200 | Kattwinkel | Jan. 11, 1927 |
| 2,258,237 | Bockius et al. | Oct. 7, 1941 |